May 17, 1960 E. P. HURD 2,937,048
WHEEL COVER
Filed Sept. 26, 1957
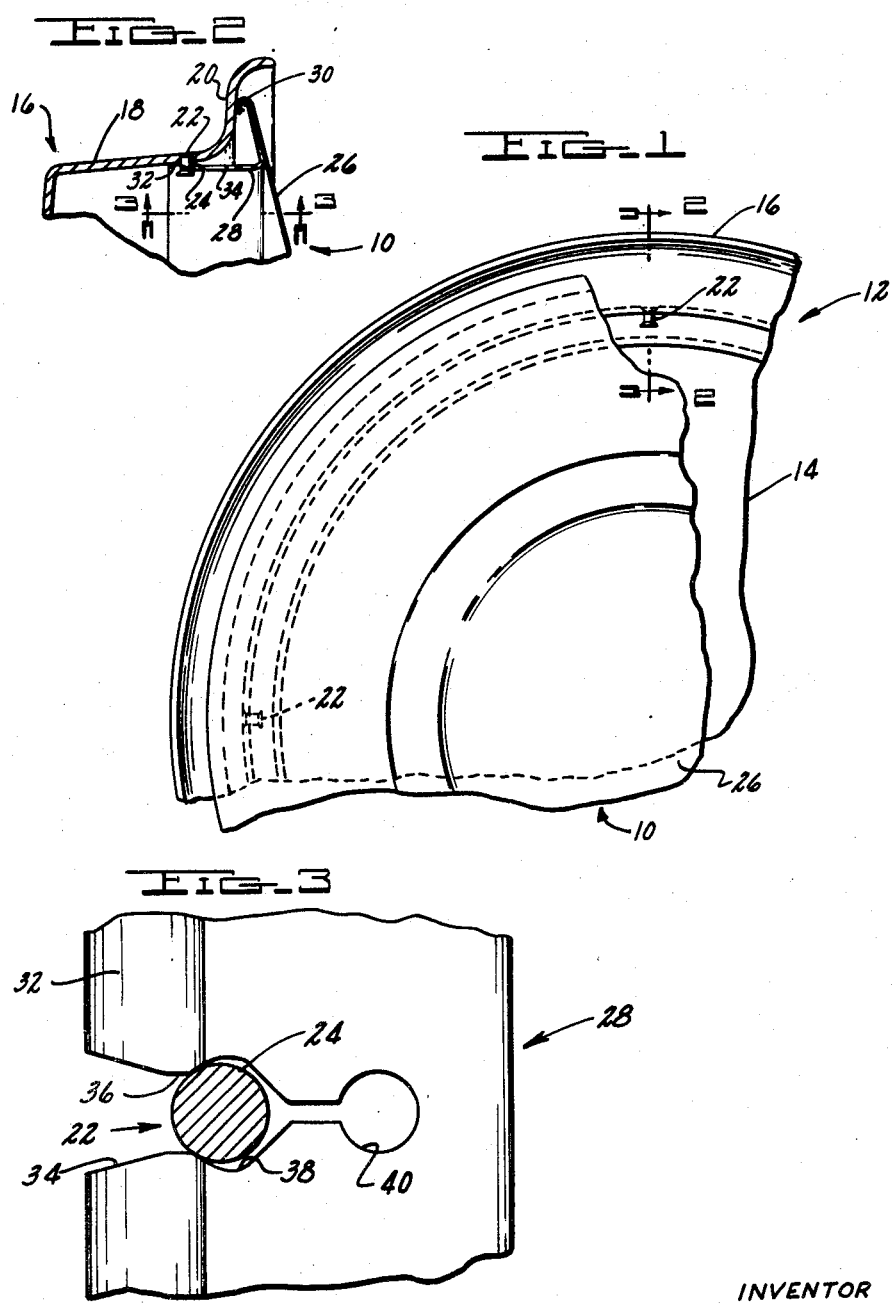
INVENTOR
EDWIN P. HURD
FINN G. OLSEN
ATTORNEY

United States Patent Office 2,937,048
Patented May 17, 1960

2,937,048

WHEEL COVER

Edwin P. Hurd, legally incapacitated, Detroit, Mich., by Anna Mary Hurd, legal representative, Detroit, Mich.; Anna M. Hurd, executrix of said Edwin P. Hurd, deceased, assignor to Hurd Lock & Manufacturing Company, a corporation of Michigan Application September 26, 1957, Serial No. 676,333

5 Claims. (Cl. 301—37)

The present invention relates to wheel covers and particularly to improvements in retaining means for holding the covers on a vehicle wheel in snap-on, pry-off relation.

It is an object of the present invention to provide an improved wheel cover for disposition at the outer side of a vehicle wheel in snap-on, pry-off relation.

It is still another object of the present invention to provide a wheel structure including a vehicle wheel and a wheel cover for disposition at the outer side thereof, said structure being constructed and arranged with cooperating portions on said wheel and cover which serve simultaneously to retain the cover on the wheel and to prevent relative rotation between the retained cover and wheel.

It is still another object of the present invention to provide a wheel structure including a vehicle wheel and a cover mounted on the wheel rim in snap-on, pry-off relation, said structure being constructed and arranged so that the cover and the attaching means can accommodate irregularities in the sizes of the various rims on which the cover might be mounted.

It is still another object of the present invention to provide a wheel structure of the foregoing character wherein the cover mounting means of the structure is constructed and arranged so that there will be no vibration between the attached parts thereby assuring that there will be no noises therefrom when the vehicle is in motion.

It is still another object of the present invention to provide an improved wheel cover for disposition at the outer side of a vehicle wheel wherein the wheel cover is formed from two pieces of simplified construction resulting in a low cost unit.

Other objects of this invention will appear in the following description and appended claims, reference being had to the accompanying drawings forming a part of this specification wherein like reference characters designate corresponding parts in the several views.

In the drawings:

Figure 1 is a fragmentary side view of a wheel structure having a cover embodying the features of this invention;

Figure 2 is a fragmentary section taken on the line 2—2 of Figure 1; and

Figure 3 is an enlarged fragmentary view taken substantially on the line 3—3 of Figure 2 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the invention will be given. The full wheel cover 10 is adapted to be applied to the outer side of a vehicle wheel 12 including a central wheel body 14 and a multi-flange drop center type rim 16. Rims of this type are in common use and include an intermediate axial flange 18 and a radially outward extending side flange 20.

As part of the present invention, a plurality of rivet-like elements 22 are uniformly spaced circumferentially around the intermediate axial flange 18 and have shanks 24 which extend radially inwardly. In the present embodiment four such elements 22 are employed. These elements 22 are used as retaining elements for aiding in holding the cover 10 on the wheel 12.

The full wheel cover 10 is formed from two pieces, an outer ornamental disk 26 and an annular member 28 which are joined at their outer peripheral edges by a suitable interlocking joint or edge 30. The annular member 28 extends generally radially inwardly from the edge 30 in engagement with the disk 26 for a limited distance after which it turns axially inwardly away from the disk 26 and terminates in a beaded edge 32.

The beaded edge 32 has a plurality of slots 34 therein extending axially toward said disk 26. These slots 34 are spaced so as to receive the shanks of the rivet-like elements 22. The configuration of one of such slots 34 can be seen in Figure 3. Referring to this figure it will be seen that the open end is outwardly flared to aid in guiding the shank 24 thereinto when pressing the cover 10 into its normal position. Inward of the flared opening is a restricted portion 36 followed by an enlarged cut-out 38. Another cut-out 40 of conventional design is in the inner end of slot 34 to prevent cracking of the annular member at the inner end of slot 34.

It will be observed that the restricted portion 36 has a smaller width than the thickness of the shank 24. Thus, the annular member 28, which is made from a sheet metal having resilient properties, will be sprung out of its normal shape when the cover 10 is pressed inward over the wheel 12 and the edges of slot 34 will return nearly to their normal positions after the cover 10 has been pressed far enough into wheel 12 to allow the shank 24 to be in the position shown in Figure 3.

The edges of slot 34 will not return fully to their normal positions because the peripheral edge 30 of the cover 10 is seated against the radially extending outer side flange 20. Thus, the cover 10 is in effect clamping the rim 16 through the shank 24 and the side flange 20 thereby holding itself on the wheel 12. Not only does this clamping action hold the cover 10 on the wheel 12, but the associated shanks 24 and slots 34 will prevent relative rotation between the cover 10 and the rim 16.

Another feature of this invention is that it is very suitable for meeting the problem of fitting a uniformly standard size of cover to wheel rims whose dimensions vary. It is to be observed that the beaded portion 32 is shaped to press against the inner surface of intermediate flange 18. Should this flange be undersize, for example, the beaded portion 32 will be urged radially inward to compensate for such undersize, which will restrict to a small extent the width of slots 34. This in turn will require the cover to be pressed onto wheel 12 a little further over shanks 24, but this will be compensated for by limited yielding in the peripheral portion of the cover 10 while still maintaining a tight clamping action on the rim 16.

This uniformly existing clamping action and the manner in which the spring properties will always maintain a tight contact between the rim 16 and the cover 10 also assures a quiet, and vibrationless operation.

Having thus described my invention, I claim:

1. In a wheel structure having an annular radial flange joined at its radially inner edge to an axially inwardly extending annular axial flange, said axial flange having a plurality of circumferentially spaced radially inwardly extending shanks, a cover for disposition at the outer side of the wheel structure having an outer peripheral portion seated on said radial flange and a circular flange connected to said outer peripheral portion and extending radially inwardly and then axially inwardly to a terminal edge portion in telescoping relation with said axial flange, said terminal edge portion being rigidified by being outwardly bowed in axial cross section, and said circular flange having a plurality of slots extending axially outwardly from its terminal edge and corresponding in number and spacing to said shanks, each of said slots having an opening at the terminal edge wider than the diameter of its associated shank and then converging together in said terminal edge portion to provide a restricted portion therein narrower than the diameter of its associated shank followed by an enlarged portion axially outward of said terminal edge portion having greater width and depth than the diameter of said shank, the axial spacing between the restricted portions of said slots and said peripheral edge being such that when the cover is mounted on the wheel structure by pressing said restricted portions over their associated shanks the cover will be placed in tension between said peripheral edge and said restricted portions thereby clampingly engaging associated parts on said wheel structure.

2. In a wheel structure as claimed in claim 1 wherein each of said slots terminates at its axially outward end in a circular portion joined to said enlarged portion by a reduced neck portion.

3. In a wheel structure as claimed in claim 1 wherein said cover has an axially outwardly facing disk portion and the radially inwardly extending portion of said circular flange fits against the inner side of said disk portion.

4. In a wheel structure as claimed in claim 1 wherein said outer peripheral portion and said terminal edge portion are the only portions of said cover which seat respectively on said radial flange and said axial flange of said wheel cover.

5. In a wheel structure as claimed in claim 1 wherein said outer peripheral portion of said cover comprises a rounded reverse bent edge into which said circular flange is interlocked.

References Cited in the file of this patent

UNITED STATES PATENTS

| | | |
|---|---|---|
| Re. 18,692 | Clark | Dec. 20, 1932 |
| 2,076,789 | Le Jeune | Apr. 13, 1937 |
| 2,130,207 | Van Halteren | Sept. 30, 1938 |
| 2,621,081 | Mann | Dec. 9, 1952 |
| 2,624,639 | Lyon | Jan. 6, 1953 |

FOREIGN PATENTS

| | | |
|---|---|---|
| 744,837 | Great Britain | Feb. 15, 1956 |